(12) United States Patent
Auston (10) Patent No.: US 9,783,232 B1
(45) Date of Patent: Oct. 10, 2017

(54) VEHICLE SUSPENSION EXTENSION SYSTEM

(71) Applicant: John Auston, Highlands Ranch, CO (US)

(72) Inventor: John Auston, Highlands Ranch, CO (US)

(*) Notice: Subject to any disclaimer, the term of this patent is extended or adjusted under 35 U.S.C. 154(b) by 0 days.

(21) Appl. No.: 15/222,732

(22) Filed: Jul. 28, 2016

(51) Int. Cl.
*B62D 21/00* (2006.01)

(52) U.S. Cl.
CPC .................... *B62D 21/00* (2013.01)

(58) Field of Classification Search
CPC B60G 2500/30; B60G 2204/61; B62D 21/11; B62D 25/00; B62D 23/00; B62D 23/005
See application file for complete search history.

(56) References Cited

U.S. PATENT DOCUMENTS

| | | | | |
|---|---|---|---|---|
| 5,567,005 A * | 10/1996 | Kosuge | ................ | B62D 21/02 296/204 |
| 6,269,902 B1 * | 8/2001 | Miyagawa | ............ | B62D 21/11 180/312 |
| 7,429,054 B1 * | 9/2008 | Turner | ................ | B60G 11/181 280/124.128 |
| 8,840,119 B2 * | 9/2014 | Davis | ..................... | B60P 1/027 280/6.157 |
| 2007/0126263 A1 * | 6/2007 | Ramsey | .................. | B60G 7/02 296/203.01 |
| 2011/0210539 A1 * | 9/2011 | Lux | ........................ | B62D 21/11 280/785 |
| 2014/0110925 A1 * | 4/2014 | Goellner | .............. | B62D 21/155 280/781 |
| 2016/0347368 A1 * | 12/2016 | Kawai | .................... | B62D 21/11 |

* cited by examiner

*Primary Examiner* — Drew J Brown
(74) *Attorney, Agent, or Firm* — IPTechLaw (57) ABSTRACT

A vehicle suspension extension apparatus. Implementations may include an extension framework of rigid metallic materials having at least one mounting hole through the extension framework at a location in the extension framework in alignment with a mounting feature of a suspension structure of a truck and is also in alignment with a mounting feature of a body of the truck.

19 Claims, 7 Drawing Sheets

VEHICLE SUSPENSION EXTENSION SYSTEM

BACKGROUND

1. Technical Field

Aspects of this document relate generally to vehicle components for raising vehicle height. More specific implementations involve raising vehicle height with components intercalated between suspension mounting features of a vehicle's unibody and the vehicle's suspension system and drive train.

2. Background

Most wheeled vehicles have suspension systems for use with the wheels of the vehicle. In addition to helping attach wheels to a vehicle, suspension systems help mitigate the effects of irregularities and defects in road surfaces while driving. Suspension systems can be attached to a vehicle in various ways. Some suspension systems are attached to a component of the vehicle separate and distinct from the vehicle body. The component is usually attached to the frame of the vehicle. Other suspension systems are designed as a substructure attached to the body of a vehicle with bolts or similar fasteners.

In some applications, increasing the height of a vehicle's body relative to the suspension system is desired. Currently, vehicle height is increased relative to the suspension system with a "vehicle suspension lift kit." Lift kits use a combination of springs and brackets attached to a frame component of the vehicle separate and distinct from the body of the vehicle.

SUMMARY

Implementations of vehicle suspension extension apparatus may include an extension framework of rigid metallic materials having at least one mounting hole through the extension framework at a location in the extension framework in alignment with a mounting feature of a suspension structure of a truck and is also in alignment with a mounting feature of a body of the truck.

Implementations of a vehicle suspension extension apparatus may include one, all, or any of the following:

The mounting feature of the body of the truck may be a mounting feature of a unibody structure of the truck.

The truck may be a light-duty truck or a sport utility vehicle.

The vehicle suspension extension apparatus may have a coating on at least a portion of the apparatus. A coating is a liquid, liquefiable, or mastic composition that is converted to a solid protective, decorative, or functional adherent film after application as a thin layer. Accordingly, the coating can include, but not be limited to, paint, powder coating, and combinations thereof.

Implementations of a vehicle suspension extension apparatus may include a first pair of supports each having at least one side and at least one void/open space within at least a portion of each support in the first pair and at least two openings in each one of the first pair of supports. The at least two openings may be in fluid communication with the at least one void space in each support in the first pair. The at least two openings may be positioned in each support of the first pair of supports at a location configured to align with a suspension mounting feature of a unibody structure of a vehicle. A length of a rigid material may be attached at opposite ends to at least one side of each support of the first pair of supports, the length of rigid material coupling the first pair of supports together. A second pair of supports may be included, each having at least one side and at least one void space within at least a portion of each support in the second pair and may include at least two openings in each one of the second pair of supports. The at least two openings may be in fluid communication with the at least one void space in each support in the second pair. The at least two openings may be positioned in each support in the second pair of supports at a location configured to align with a suspension mounting feature of the unibody structure of the vehicle. At least two lengths of rigid material may be attached at opposite ends of each support of the second pair of supports where the at least two lengths of rigid material couple the second pair of supports together.

Implementations of a vehicle suspension extension apparatus may include one, all, or any of the following:

A vehicle suspension extension apparatus may include at least one mounting bracket attached to at least one end of at least one support of the second pair of supports.

The first pair of supports, the second pair of supports, the rigid material, and the at least one mounting bracket are each made of at least one metallic material.

A coating may be placed on at least a portion of at least one surface of the apparatus. The coating may be a polymeric material, a powder coating, and combinations thereof.

Implementations a vehicle suspension extension apparatus may include a plurality of individual supports each having at least one side and at least one void space within at least a portion of each support, wherein each support has at least two openings in fluid communication with the at least one void space. The at least two openings of the each of the plurality of supports may be positioned to align with a suspension mounting feature of a unibody structure of a vehicle. Adjacent supports may be coupled together with at least one length of a rigid material attached at opposite ends to one or more sides of each adjacent support. At least one mounting bracket may be coupled to at least one support of the plurality of supports.

Implementations of a vehicle suspension extension apparatus may include one, all, or any of the following:

A vehicle suspension extension apparatus may include two lengths of the rigid material and at least one brace coupling the two lengths of the rigid material.

The vehicle suspension extension apparatus may include at least one mounting bracket attached to the at least one length of rigid material.

The at least one brace may be coupled substantially orthogonally with respect to each of the two lengths of the rigid material.

The plurality of supports, the at least one length of rigid material, and the at least one mounting bracket may be made of at least one metallic material.

The vehicle suspension extension apparatus may have a coating on at least a portion of at least one surface of the apparatus.

The coating may be one of a polymeric material, a power coating, and any combination thereof.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended vehicle suspension extension apparatus will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such vehicle suspension extension apparatuses, and implementing components and methods, consistent with the intended operation and methods.

Implementations of vehicle suspension extension systems like those disclosed herein are used in vehicles with a suspension system bolted to the body of the vehicle. The suspension extension system, in various implementations, bolts on to the body of the vehicle and is in the form of a carriage or cradle. Implementations are installed between the body/unibody of a vehicle and the vehicle's existing suspension system. Once a suspension extension system implementation is installed, the suspension system of the vehicle is located farther from the body and related parts of the vehicle. This results in the body of the vehicle having increased height relative to a driving surface and/or increased range of motion, or travel, of the suspension system. In light-duty trucks, sport utility vehicles, and other off road vehicles, the increased body height, or clearance, and suspension travel permit use of various alternative parts with the vehicle, such as large tires. Vehicles made with a unitary body, or unibody, construction method are most suitable for use with the implementations. This is because conventional lift kit systems require that the vehicle have a frame separable from the body in order for the height of the body to be raised relative to the vehicle suspension.

Implementations usually include two vehicle suspension extension modules or assemblies. One module is used to alter the location of a vehicle's front suspension and drivetrain components (if present) relative to the framework and body of the vehicle. Another module is used to alter the location of a vehicle's rear suspension and drivetrain components relative to the framework and body of the vehicle. These modules result in increased height, or elevation, of the framework and body of the vehicle above the ground. In most implementations, the framework, floorplan, and body of the vehicle have received unitized body, or unibody, construction. In unibody construction, the framework, or chassis, is integrated with the floorplan and bodywork of a vehicle to form a single, one-piece, unitary frame, floorplan, and bodywork structure.

Figure 1:
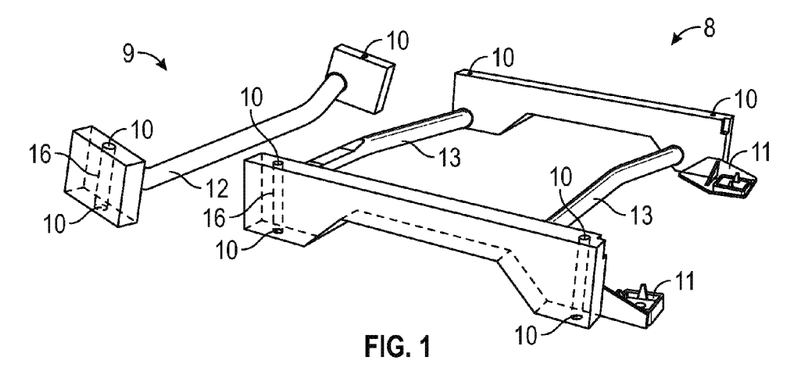
FIG. 1 is a perspective view of an implementation of a set of unibody vehicle front end suspension extension modules.
Figure 7:
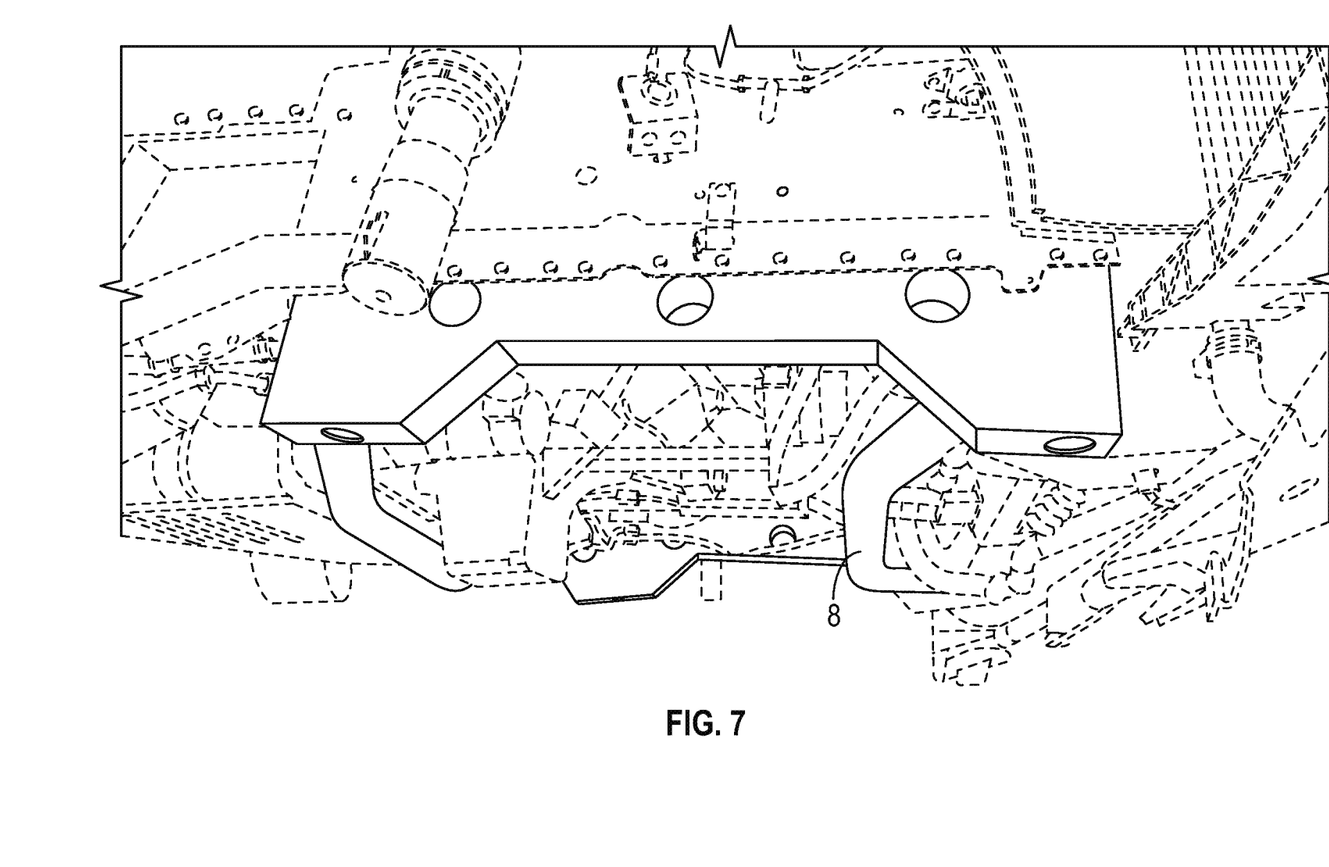
FIG. 7 is a perspective view of an implementation of a front end suspension extension module mounted to a unibody vehicle.
Figure 8:
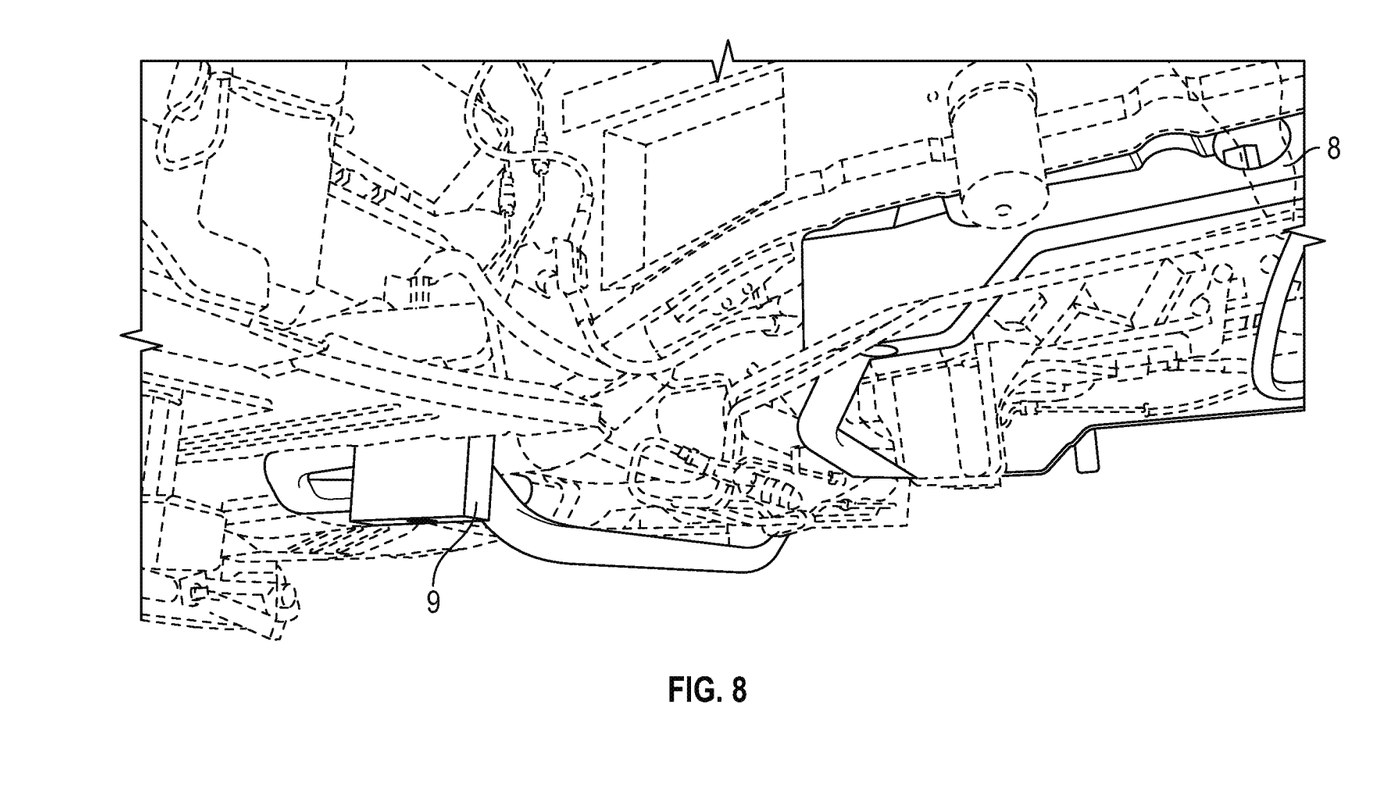
FIG. 8 is a perspective view of another portion of an implementation of a front end suspension extension module mounted to a unibody vehicle.

As illustrated in FIG. 1, an implementation for altering the location of a vehicle's front suspension and drivetrain components has two separate modules (8, 9). One module (9) has a pair of supports (2) each having at least one side and at least one void space/opening (16) traversing each support (2) between the openings (10). In some implementations, the supports (2) may be formed of welded metal plate, forming a boxed in channel structure, while in others, the supports (2) may be formed of a single piece of metal. In various implementations other openings may be present extending through the support (2) as illustrated in the Figures enclosed with document. The supports (2) of the implementation illustrated in FIG. 1 may be polygonal in shape and made of a robust metallic material. The metallic material can be readily welded and coated in many implementations. The supports (2) have at least two openings (10) located in opposite areas of the at least one void space (16). The openings (10) and void space (16) receive and house mounting hardware (such as bolts, nuts, washers, and the like) used to attach the implementation to the unibody of a vehicle. FIGS. 7 and 8 show one module (8) of the front end suspension extension pair (8, 9) mounted to the front end suspension mounting features and hardware of a representative unibody vehicle. The unibody and other features of the vehicle are shown in dotted lines. The supports (2) are connected with a length of a rigid material/support (12). The length of rigid material (12) is attached at opposite ends to at least one side of each support (2) in the pair of modules (8, 9). In the implementation illustrated in FIG. 1, the length of rigid material (12) is rounded in cross-section and shaped to accommodate other mechanical parts of a vehicle, such as a radiator which the material (12) may need to pass next to. The void space opening (10) of at least one support (2) is positioned and/or configured to align with a suspension mounting feature of a unibody structure of a vehicle. In many implementations, the suspension mounting feature is a threaded bolt attached to the unibody. In some implementations, protrusions and/or indentations in the contours of the unibody are part of a suspension mounting feature and assist in aligning and limiting movement of suspension and drivetrain components.

The second module (8) for altering the location of a vehicle's front suspension and drivetrain components has two supports (2). In the implementation illustrated in FIG. 1, the supports (2) are polygonal and substantially parallel. Each support (2) has a void space (16) that forms an opening between the accompanying openings (10) located near each end of each support (2). The void space (16) traverses the support in the depth dimension when viewed using the standard length, width, and depth system of measurement. Each support (2) is shaped to conform with and accommodate the contours of a unibody and mechanical parts of a vehicle. In the implementation illustrated in FIG. 1, the two supports (2) are connected with at least two lengths of a rigid material (13). Each length of rigid material (13) is attached at opposite ends to at least one side of each support (2). Each length of rigid material (13) serves as an elongated brace for the module (8). The length of rigid material (13) illustrated in FIG. 1 is rounded in cross-section and shaped to accommodate mechanical parts of a vehicle, such as an oil pan. The void space opening (10) of at least one support (2) is positioned and/or configured to align with a suspension mounting feature of a unibody structure of a vehicle. The openings (10) also are designed to allow for coupling of the remaining structure of the vehicle's suspension to the support (2). In many implementations, the suspension mounting feature is a threaded bolt attached to the unibody. In some implementations, protrusions and/or indentations in the contours of the unibody are part of a suspension mounting feature and assist in aligning and limiting movement of suspension and drivetrain components. In many implementations, mounting and/or alignment brackets (11) are attached to one or more supports (2) at locations dictated by the geometries of a particular vehicle or by the need to mount particular components of the vehicle's suspension thereto.

Figure 2:
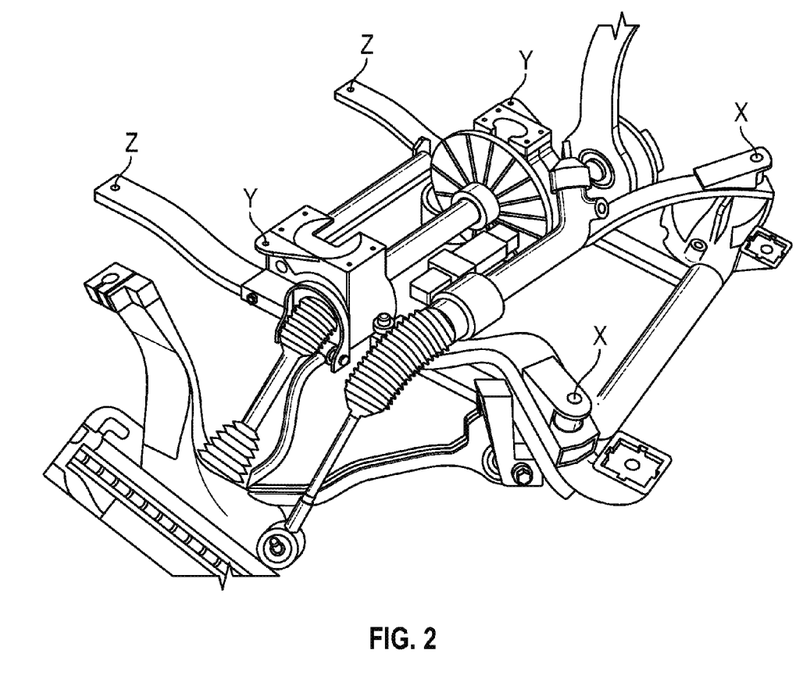
FIG. 2 is a perspective view of a front end suspension, drive train, and mounting components of a representative vehicle.

As illustrated in FIG. 2, the mounting openings (10) are designed to correspond with the attachment points X, Y, and Z of a front-end suspension of a vehicle. In this way, the support (2) can be interposed between the unibody of the vehicle and the front-end suspension while maintaining the structural rigidity desired.

Figure 3:
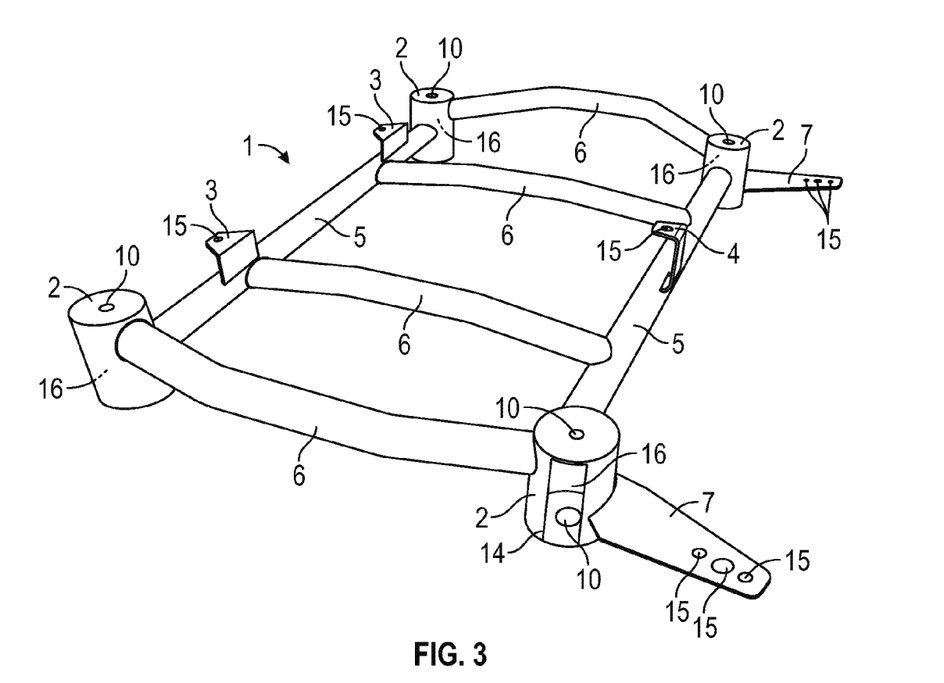
FIG. 3 is a perspective view of an implementation of a unibody vehicle rear end suspension extension module.

In various system implementations, a second module (1) is used to lift the rear-end suspension of the vehicle. As illustrated in FIG. 3, the module (1) has a plurality of individual supports attached together with a series of rigid materials to form a robust suspension extension apparatus. The module (1) illustrated in FIG. 3 has four supports (2) in coupled at desired locations along the lengths of rigid material/connectors (5) that couple the supports (2) together. Each support (2) has a void space/opening (16) therein with openings (10) at opposite ends of the void space (16). The void space (16) and combined openings (10) provide passageways which accommodate suspension mounting hardware is placed when the module (1) is connected to a unibody suspension mounting feature of vehicle and with the rear suspension of the vehicle. The supports (2) may have areas of wall material (14) removed from of one or more sides of the support (2). These areas are often in the form of cutouts. In the implementation illustrated in FIG. 3, the four supports (2) each have a cylindrical shape and are connected with lengths of rigid materials (5, 6). As illustrated in FIG. 3, each length of rigid material (5, 6) is attached at opposite ends to an appropriate side of a support (2). In addition, lengths of rigid material (6) serving as braces are attached at an angle which may be orthogonal or substantially orthogonal to the rigid materials (5). Alignment and/or mounting brackets (3, 4) are attached at appropriate locations to one or more lengths of rigid material (5). Alignment and/or mounting brackets (7) are similarly attached at appropriate locations to one or more supports (2). Holes (15) appropriately located in the alignment and/or mounting brackets (3, 4, 7) may be included to accommodate suspension mounting hardware and/or suspension mounting couplers for a unibody of the vehicle.

Figure 4:
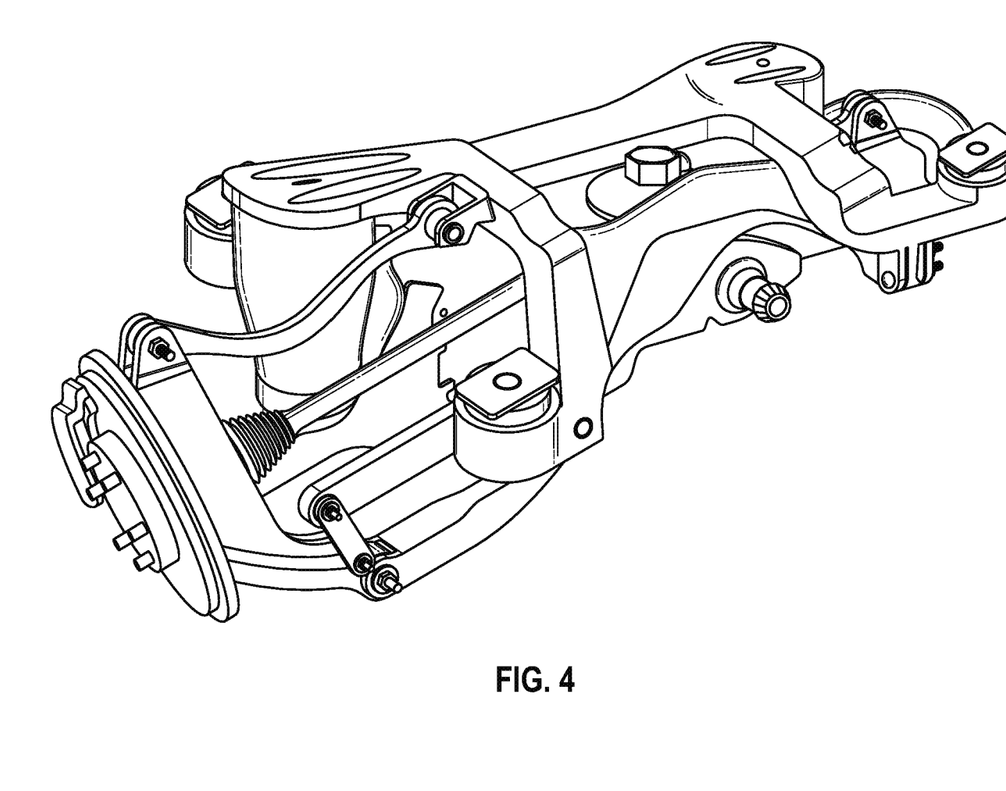
FIG. 4 is a perspective view of a rear end suspension, drive train, and mounting components of a representative vehicle.
Figure 5:
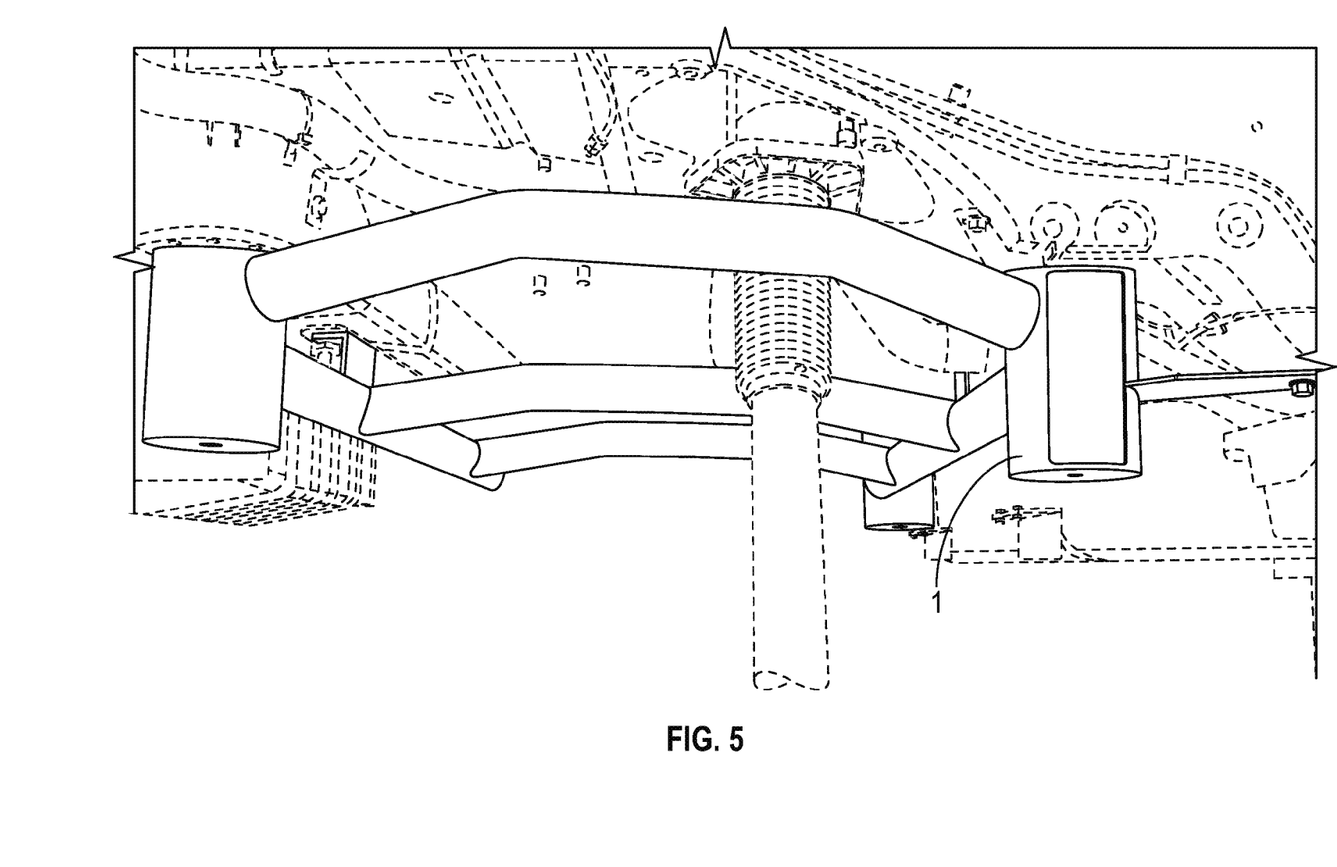
FIG. 5 is a perspective view of an implementation of a rear end suspension extension module mounted to a unibody vehicle.
Figure 6:
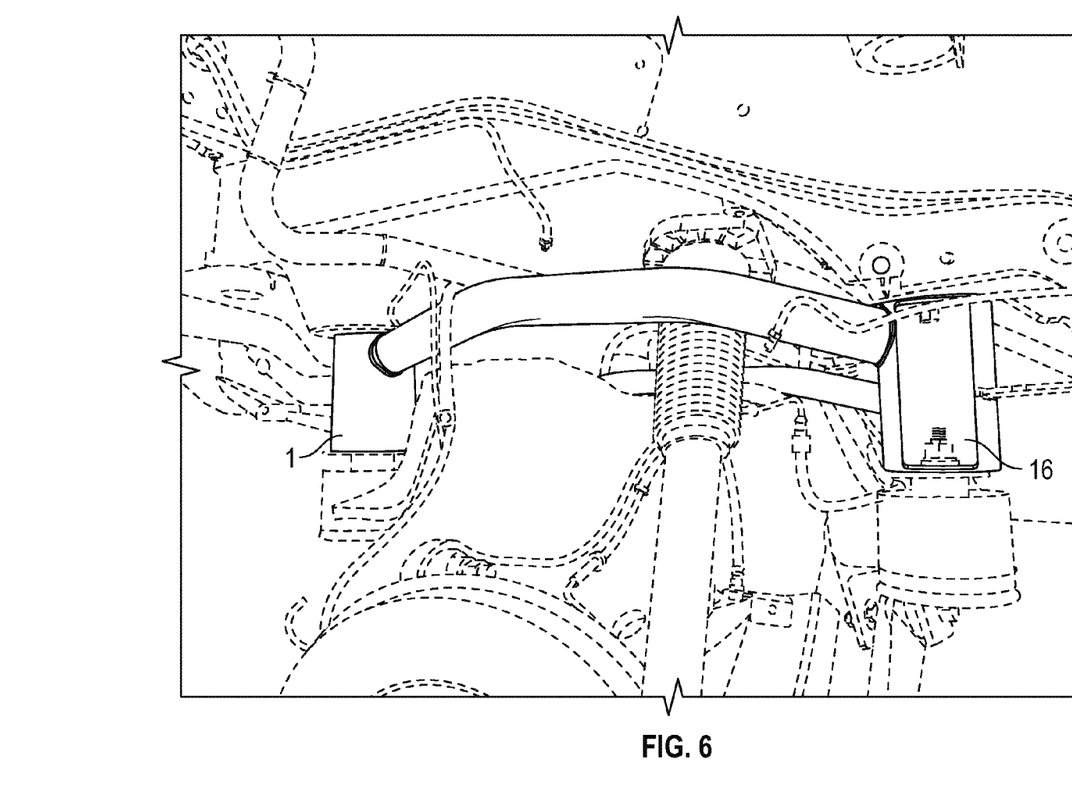
FIG. 6 is a perspective view of view of an implementation of a rear end suspension extension module mounted between a unibody vehicle and rear end suspension components of a representative vehicle.

FIG. 4 illustrates an implementation of a rear suspension system for a vehicle that may be used in various system implementations. FIG. 5 illustrates the module (1) coupled to the unibody of the vehicle (shown in dotted lines). FIG. 6 illustrates the remaining suspension structure of the vehicle, including the rear suspension components illustrated in FIG. 4. FIG. 6 illustrates how the mounting components of the suspension can be included inside the void (16) area of the module (1) and also the unibody mounting components of the suspension can also fit into the void (16) as well. In this way the module (1) interposes itself between the structure of the unibody and the rear suspension components of the vehicle, lifting the unibody portion upwardly relative to the rear suspension, while maintaining the rigidity of unibody of the vehicle even though no separable frame was provided in the original vehicle design.

Because the various vehicle suspension extension systems disclosed herein are used to do extensions on vehicles which have unibody construction, lifting of such vehicles may be able to be achieved. Traditionally, only vehicles with separable frames to which the body was coupled were capable of being lifted. Because the modules disclosed herein are designed to both interpose between the suspension and the unibody and simultaneously provide rigidity and structure between the suspension and unibody, these modules allow the vehicle to be lifted without substantially compromising its rigidity.

In various system implementations one or more coatings may be applied to one or more surfaces of either or both modules (1, 2) disclosed herein. The surfaces of the module include internal surfaces as well as external surfaces. The coating can be in the form of electroplated or electroless plated materials of various kinds, paint of various formulations and methods of application, powder coatings, flame sprayed coatings, or any other coating or covering material capable of protecting/strengthening the surface of the modules (1, 2). Those of ordinary skill in the art will readily be able to select appropriate materials using the principles disclosed herein.

Implementations of the suspension extension modules are useful with light-duty trucks, sport utility vehicles, and other off road vehicles. A suspension extension module or apparatus is installed between a unibody and the vehicle's suspension and drive train components (if any). Installation of the front suspension modules begins with removal of the suspension and drive train components (if present) from the vehicle. A representative vehicle front suspension assembly with drive train components is illustrated in FIG. 2. Mounting points for the assembly are denoted by the letters "X," "Y," and "Z." A pair of front suspension extension modules (8, 9) is then attached to appropriate mounting hardware and/or features of the unibody and then to the front suspension assembly. FIG. 7 illustrates a front suspension extension module (8) attached to the front suspension hardware and mounting features of a unibody vehicle.

Installation of the rear suspension modules begins with removal of the rear suspension and drive train components from the vehicle. A representative vehicle rear suspension assembly with drive train components is illustrated in FIG. 4. A rear suspension extension module (1) is then attached to appropriate mounting hardware and/or features of a unibody followed by attachment of the rear suspension to the module (1). FIG. 5 illustrates a rear suspension extension module (1) attached to rear suspension hardware and mounting features of a unibody vehicle.

In places where the description above refers to particular implementations of vehicle suspension extension modules or apparatuses and implementing components, sub-components, methods and sub-methods, it should be readily apparent that a number of modifications may be made without departing from the spirit thereof and that these implementations, implementing components, sub-components, methods and sub-methods may be applied to other vehicle suspension extension modules or apparatuses.

What is claimed is:

1. A vehicle suspension extension apparatus comprising:
an extension framework of rigid metallic materials having at least one mounting hole through the extension framework at a location in the extension framework in alignment with a mounting feature of a suspension structure of a truck and is also in alignment with a mounting feature of a body of the truck, wherein the mounting feature of the body of the truck is a mounting feature of a unibody structure of the truck.

2. The vehicle suspension extension apparatus of claim 1 wherein the truck is a light-duty truck.

3. The vehicle suspension extension apparatus of claim 1 wherein the truck is a sport utility vehicle.

4. The vehicle suspension extension apparatus of claim 1 further comprising a coating on at least a portion of the apparatus.

5. The vehicle suspension extension apparatus of claim 4 wherein the coating is paint.

6. The vehicle suspension extension apparatus of claim 4 wherein the coating is a powder coating.

7. A vehicle suspension extension apparatus comprising:
a first pair of supports each having at least one side and at least one void space within at least a portion of each support of the first pair;
at least two openings in each one of the first pair of supports, the at least two openings in fluid communication with the at least one void space in each support of the first pair, the at least two openings positioned in each support of the first pair of supports at a location configured to align with a first suspension mounting feature of a unibody structure of a vehicle;
a length of a rigid material attached at opposite ends to at least one side of each support of the first pair of supports, the length of rigid material coupling the first pair of supports together;
a second pair of supports each having at least one side and at least one void space within at least a portion of each support of the second pair;
at least two openings in each one of the second pair of supports, the at least two openings in fluid communication with the at least one void space in each support of the second pair, the at least two openings positioned in each support of the second pair of supports at a location configured to align with a first suspension mounting feature of the unibody structure of the vehicle; and
at least two lengths of rigid material attached at opposing ends of each support of the second pair of supports, the at least two lengths of rigid material coupling the second pair of supports together.

8. The vehicle suspension extension apparatus of claim 7 further comprising:
at least one mounting bracket attached to at least one end of at least one support of the second pair of supports.

9. The vehicle suspension extension apparatus of claim 7 wherein the first pair of supports, the second pair of supports, the rigid material, and the at least one mounting bracket are each made of at least one metallic material.

10. The vehicle suspension extension apparatus of claim 7 further comprising a coating on at least a portion of at least one surface of the apparatus.

11. The vehicle suspension extension apparatus of claim 10 wherein the coating comprises a polymeric material.

12. The vehicle suspension extension apparatus of claim 11 wherein the coating is a powder coating.

13. A vehicle suspension extension apparatus comprising:
a plurality of individual supports each having at least one side and at least one void space within at least a portion of each support;
wherein each support has at least two openings in fluid communication with the at least one void space;
wherein the at least two openings of each of the plurality of supports are positioned to align with a suspension mounting feature of a unibody structure of a vehicle;
wherein adjacent supports are coupled together with at least one length of a rigid material attached at opposite ends to one or more sides of each adjacent support; and
at least one mounting bracket is coupled to at least one support of the plurality of supports.

14. The vehicle suspension extension apparatus of claim 13 further comprising two lengths of the rigid material and at least one brace coupling the two lengths of the rigid material.

15. The vehicle suspension extension apparatus of claim 13 further comprising at least one mounting bracket attached to the at least one length of rigid material.

16. The vehicle suspension extension apparatus of claim 14 wherein the at least one brace is coupled substantially orthogonally with respect to each of the two lengths of the rigid material.

17. The vehicle suspension extension apparatus of claim 13 wherein the plurality of supports, the at least one length of rigid material, and the at least one mounting bracket are made of at least one metallic material.

18. The vehicle suspension extension apparatus of claim 13 further comprising a coating on at least a portion of at least one surface of the apparatus.

19. The vehicle suspension extension apparatus of claim 18 wherein the coating is one of a polymeric material, a power coating, and any combination thereof.

* * * * *

UNITED STATES PATENT AND TRADEMARK OFFICE
CERTIFICATE OF CORRECTION

PATENT NO. : 9,783,232 B1
APPLICATION NO. : 15/222732
DATED : October 10, 2017
INVENTOR(S) : John Auston

Page 1 of 1

It is certified that error appears in the above-identified patent and that said Letters Patent is hereby corrected as shown below:

In the Claims

Column 7, Line 45 of Claim 7; delete "first", and insert --second--

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*